(12) United States Patent
Cui et al.

(10) Patent No.: US 10,021,701 B2
(45) Date of Patent: Jul. 10, 2018

(54) WIRELESS COMMUNICATION METHOD AND WIRELESS COMMUNICATION DEVICE

(71) Applicant: SONY CORPORATION, Tokyo (JP)

(72) Inventors: Qimei Cui, Beijing (CN); Xiaona Li, Beijing (CN); Weijuan Gao, Beijing (CN); Hui Wang, Beijing (CN); Jiang Han, Beijing (CN)

(73) Assignee: Sony Corporation, Tokyo (JP)

( * ) Notice: Subject to any disclaimer, the term of this patent is extended or adjusted under 35 U.S.C. 154(b) by 379 days.

(21) Appl. No.: 14/759,534

(22) PCT Filed: Dec. 26, 2013

(86) PCT No.: PCT/CN2013/090507
§ 371 (c)(1),
(2) Date: Jul. 7, 2015

(87) PCT Pub. No.: WO2014/108028
PCT Pub. Date: Jul. 17, 2014

(65) Prior Publication Data
US 2015/0351108 A1   Dec. 3, 2015

(30) Foreign Application Priority Data
Jan. 8, 2013 (CN) .......................... 2013 1 0006494

(51) Int. Cl.
*H04W 4/00* (2018.01)
*H04W 72/08* (2009.01)
(Continued)

(52) U.S. Cl.
CPC ........ *H04W 72/082* (2013.01); *H04B 17/345* (2015.01); *H04J 11/0053* (2013.01);
(Continued)

(58) Field of Classification Search
None
See application file for complete search history.

(56) References Cited

U.S. PATENT DOCUMENTS

2012/0106465 A1* 5/2012 Haghighat ........ H04W 72/1289
370/329
2014/0036800 A1* 2/2014 Frenne ................. H04L 5/0035
370/329
(Continued)

FOREIGN PATENT DOCUMENTS

CN      102118767       7/2011
CN      102215533       10/2011
(Continued)

OTHER PUBLICATIONS

International Search Report dated Apr. 3, 2014 in PCT/CN2013/090507 Filed Dec. 26, 2013.

*Primary Examiner* — Jutai Kao
(74) *Attorney, Agent, or Firm* — Oblon, McClelland, Maier & Neustadt, L.L.P.

(57) ABSTRACT

A wireless communication method and a wireless communication device. The wireless communication method is used in a coordinated multi-point communication system, and includes: recognizing an edge user equipment; determining the presence of interference to an enhanced physical downlink control channel (ePDCCH) of the edge user equipment; and in response to the determination of the presence of the interference, determining different interference coordination manners according to different scenarios, so as to control the transmission of the ePDCCH or a physical downlink shared channel (PDSCH) of a neighbor cell related to the interference.

19 Claims, 9 Drawing Sheets

(51) Int. Cl.
*H04W 72/04* (2009.01)
*H04W 24/10* (2009.01)
*H04L 5/00* (2006.01)
*H04W 16/14* (2009.01)
*H04L 1/00* (2006.01)
*H04W 16/10* (2009.01)
*H04W 24/02* (2009.01)
*H04B 17/345* (2015.01)
*H04J 11/00* (2006.01)
*H04W 52/24* (2009.01)
*H04W 52/44* (2009.01)

(52) U.S. Cl.
CPC .............. *H04L 1/00* (2013.01); *H04L 5/0035* (2013.01); *H04W 16/10* (2013.01); *H04W 16/14* (2013.01); *H04W 24/02* (2013.01); *H04W 24/10* (2013.01); *H04W 52/243* (2013.01); *H04W 52/44* (2013.01); *H04W 72/04* (2013.01); *H04W 72/042* (2013.01); *H04L 5/0053* (2013.01)

(56) References Cited

U.S. PATENT DOCUMENTS

2014/0098754 A1* 4/2014 Luo .................... H04L 5/0053
370/329
2014/0192759 A1* 7/2014 Son ................. H04W 72/0426
370/329

FOREIGN PATENT DOCUMENTS

CN 102291785 12/2011
WO 2011 137383 11/2011

* cited by examiner

WIRELESS COMMUNICATION METHOD AND WIRELESS COMMUNICATION DEVICE

FIELD

The disclosure generally relates to the field of wireless communications, and in particular to a wireless communication method and a wireless communication device used in a cooperative multi-point communication system.

BACKGROUND

A Long Term Evolution (LTE) system is a frequency division system which adopts Orthogonal Frequency Division Multiplexing (OFDM) as a basic multiple access multiplexing manner. In the system, there is little interference inside a cell due to the completely orthogonal frequency division. However, interference at the edge of a cell is relatively serious, thus spectral efficiency at the edge of a cell is concerned. At present, there are mainly three methods for processing the interference at the edge of a cell in LTE: interference randomization, interference elimination and interference coordination (elusion). The interference coordination becomes a mainstream technology for restraining the interference between cells, due to its simple realization, capability of being applied to various bandwidths and good effect on interference restraint.

Currently, the interference coordination generally employs frequency reuse schemes such as fractional frequency reuse and soft frequency reuse, which can effectively restrain common-frequency interference between cell edge users.

With the growing shortage of spectrum resource and the increasing user requirements on the Quality of Service (QoS), LTE-A, which is a follow-up evolution of LTE, puts higher demands on both cell average spectrum efficiency and cell edge spectrum efficiency. For the future wireless communication system, it is desired to realize full frequency reuse in addition to further improved performance of edge users, so as to obtain higher cell average spectrum efficiency at the same time. Moreover, an enhanced Physical Downlink Control Channel (ePDCCH) is introduced in LTE-A, that is, the transmission of the ePDCCH is allowed by using a part of resource in original Physical Downlink Shared Channel (PDSCH).

SUMMARY

The introduction of ePDCCH makes it inevitable to further reduce interference between edge users. However, average spectrum efficiency of a cell may decrease seriously since the edge reuse factor of fractional frequency reuse is 3, and the performance of soft frequency reuse will decrease rapidly as the amount of system load increases. Therefore, the conventional interference coordination technologies based on frequency reuse can not meet the demands and a new interference coordination scheme is in urgent demand.

In order to further reduce the interference between edge users in a LTE-A system in which ePDCCH is introduced, and then to achieve a full frequency reuse based on the improved performance of edge users, the present disclosure provides a wireless communication method and a wireless communication device for ePDCCH interference coordination for use in a cooperative multi-point communication system.

According to an aspect of the present disclosure, a wireless communication method for use in a cooperative multi-point communications system is provided, the method includes: identifying an edge user equipment; determining a presence of interference to an enhanced Physical Downlink Control Channel, ePDCCH, of the edge user equipment; and in response to the determination of a presence of the interference, determining different interference coordination manners according to different relationships of channels with mutual interference, to control a transmission of ePDCCHs or Physical Downlink Shared Channels, PDSCHs, of neighboring cells related to the interference.

In another aspect of the present disclosure, a wireless communication device for use in a cooperation multi-points communication system is provided, the device includes: an identification unit configured to identify an edge user equipment; an interference determination unit configured to determine a presence of interference to ePDCCH of the edge user equipment; and an interference coordination unit configured to, in response to the determination of a presence of interference, determine different interference coordination manners according to different relationships of channels with mutual interference to control transmission of ePDCCHs or PDSCHs of neighboring cells related to the interference.

With the wireless communication method and wireless communication device according to the present disclosure, higher cell average spectrum efficiency is ensured, while the ePDCCH interference between edge users is reduced, the accuracy of control information received by the edge user is ensured, and the spectrum efficiency of the edge user of the cell is significantly improved.

It should be understood that, the above general description and the following detailed description are both exemplary and illustrative, but not to limit the invention.

BRIEF DESCRIPTION OF THE DRAWINGS

The above and other objectives, features and advantages of the present disclosure will be understood more easily with reference to the following embodiments according to the present disclosure described in conjunction with the drawings. In the drawings, the same or corresponding reference numbers indicate the same or corresponding technical features or components. The sizes and relative positions of elements are not necessarily drawn to scale in the drawings.

EMBODIMENTS

Figure 1:
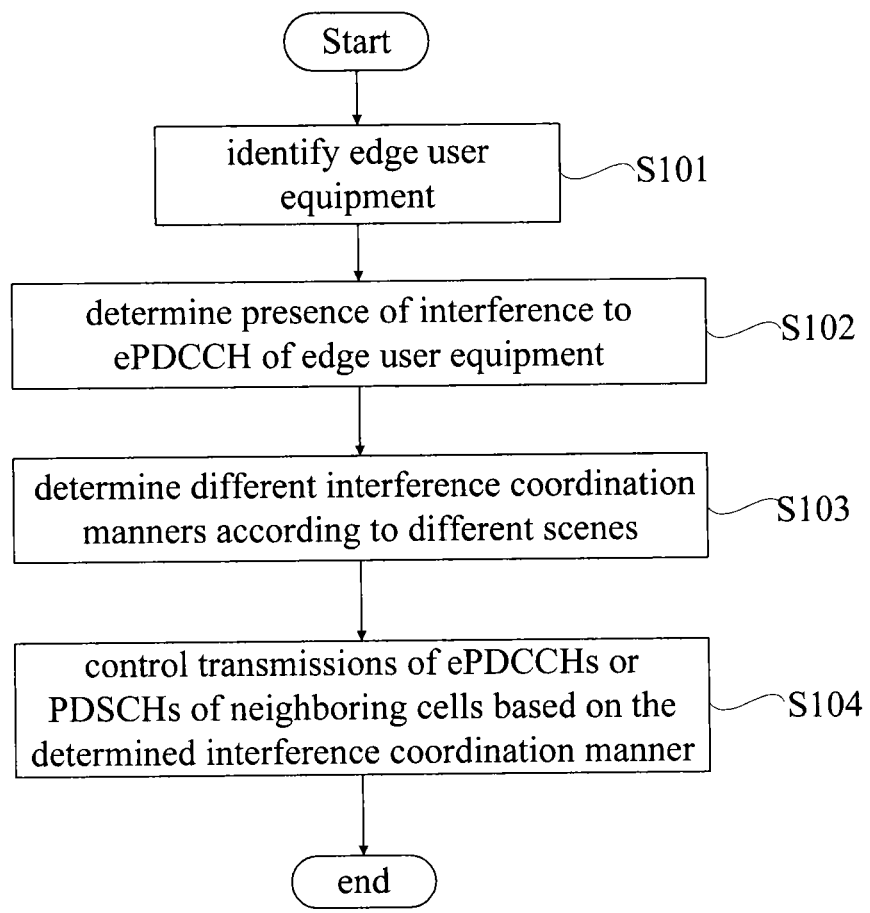
FIG. 1 is a flowchart showing a wireless communication method according to an embodiment of the present invention.

In the following, embodiments of the present invention are described with reference to the drawings. It should be noted that, for purposes of clarity, expressions and descriptions on components and processes, which are not related to the present disclosure and known to those skilled in the art, are omitted in the drawings and descriptions.

FIG. 1 is a flowchart showing a wireless communication method according to an embodiment of the present invention. With the method, an optimal interference coordination manner may be employed in accordance with different scenes, to control the transmission of ePDCCHs or PDSCHs of neighboring cells.

In step S101, an edge user equipment is identified. Specifically, the edge user equipment may be defined and identified by using any methods well-known in the art, such as an identification method using Channel Quality Information (CQI) feedback and an identification method using Reference Signal Received Power (RSRP). In the following, only the identification method using RSRP is described as an example.

In the identification method using RSRP, a threshold value α is preset, and a user equipment is identified as an edge user equipment in a case where the RSRP of a serving cell of the user equipment ($RSRP_{serving\_cell}$) and the RSRP of a certain cell adjacent to the serving cell ($RSRP_{adjacent\_cell}$) satisfies Formula (1):

$$RSRP_{serving\_cell} - RSRP_{adjacent\_cell} < \alpha \qquad (1)$$

The threshold α may be set based on factors such as an anti-interference capability and a design requirement of a communication system.

If a user equipment is identified as the edge user equipment, it is determined in step S102 whether an interference on an ePDCCH of the user equipment presents.

In a case where baseband is shared between neighboring cells, the cells do not need to share ePDCCH configuration information with each other since a baseband processing center (i.e. a center node or referred to as "baseband cloud") has known the ePDCCH configuration of each cell. In other words, in the case that baseband is shared between neighboring cells, the baseband processing center may determine whether the interference on the ePDCCH of the edge user equipment presents.

In a case of unshared baseband, configuration sharing signalings for sharing the ePDCCH configuration information need to be transmitted between neighboring cells to share the ePDCCH configuration information between the neighboring cells. For example, in a case where a network topology is irregular, such as a case of coexistence of a macrocell and a microcell, the ePDCCH configuration information may be shared through X2 or S1 interface between the macrocell and the microcell. Since the manner of sharing PDSCH configuration information between cells has been well-known to those skilled in the art, it will not be described herein.

Figure 2:
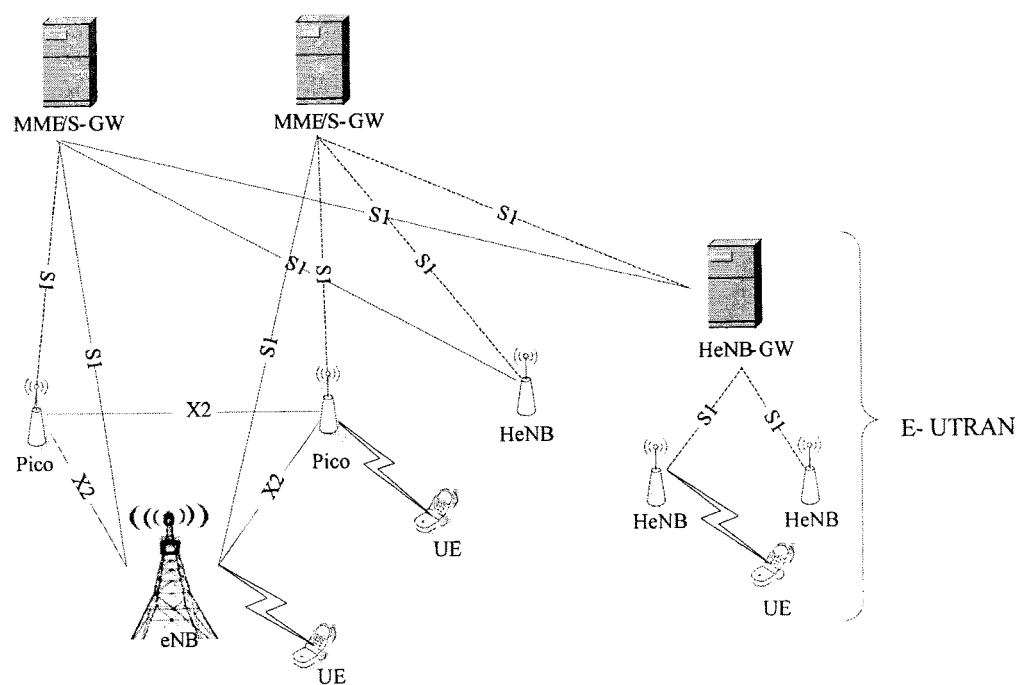
FIG. 2 is a schematic diagram showing an evolved Universal Terrestrial Radio Access Network (E-UTRAN) as an example network of unshared baseband in which a method according to an embodiment of the present invention may be applied.

FIG. 2 is a schematic diagram of an evolved Universal Terrestrial Radio Access Network (E-UTRAN) as a network example of unshared baseband in which a method according to an embodiment of the present invention may be applied. In the example shown in FIG. 2, configuration sharing signaling may be transmitted through X2 interface between an evolved base station (eNB) and a pico base station (Pico) and between pico base stations for sharing ePDCCH configurations of user equipment (UE) to be scheduled by the base stations. An evolved base station, a pico base station and a home base station (HeNB) may respectively transmit the configuration sharing signaling for sharing the ePDCCH configuration to a mobility manage equipment/service gateway (MME/S-GW) through S1 interface. Similarly, a home base station and a home base station gateway (HeNB-GW) may transmit the configuration sharing signaling for sharing ePDCCH configuration through S1 interface.

Returning to FIG. 1, in the case of unshared baseband, in step S102, whether the interference on the ePDCCH of the edge user equipment presents is determined based on the ePDCCH configuration shared by transmitting the configuration sharing signaling between the neighboring cells. A normal scheduling may be performed if the interference does not present. If the interference presents, in step S103, in response to the determination on the presence of the interference, different interference coordination manners are determined according to different scenes.

Specifically, for example, at least one of the following interference coordination manners may be employed based on different scenes:

Manner 1, neighboring cells related to the interference all transmit ePDCCH;

Manner 2, one of the neighboring cells related to the interference transmits ePDCCH normally and the other cell blanks a resource for transmitting ePDCCH or PDSCH; and Manner 3, one of the neighboring cells related to the interference transmits ePDCCH normally, and the other cell allocates the resource for transmitting ePDCCH or PDSCH to user equipments in its center region or other sectors to transmit one of PDSCH and ePDCCH.

Figure 3A:
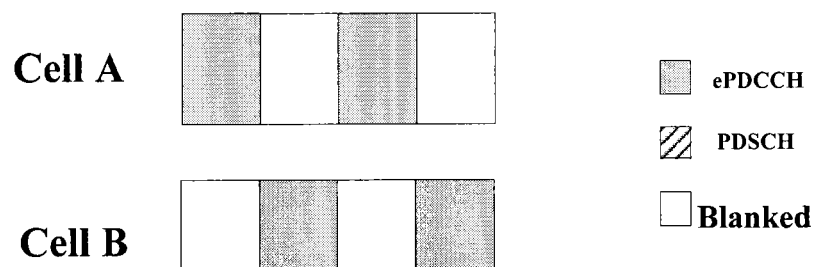
FIGS. 3A-3C are schematic diagrams showing examples for different interference coordination manners.
Figure 3B:
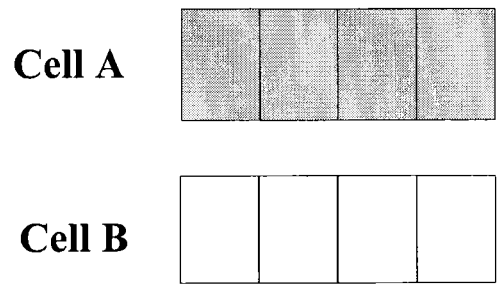
Figure 3C:
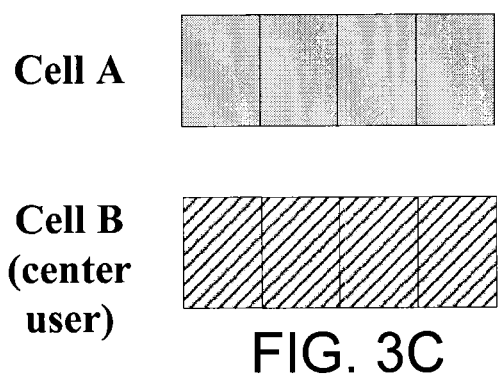

FIGS. 3A-3C are schematic diagrams of examples of different interference coordination manners. FIG. 3A shows an example of interference coordination manner of manner 1. In the example, interference of ePDCCHs occurs between neighboring cells A and B, and the neighboring cells A and B related to the interference transmit ePDCCHs in an orthogonal manner. In this way, the neighboring cells A and B may both transmit ePDCCHs without interfering each other. For example, the transmissions of ePDCCHs of cells A and B may multiplex frequency in a bitmap manner. The example is substantially applicable in various wireless communication scenes. For example, it is applicable in the scene in which neighboring cells A and B have the same transmission power and both have high transmission power.

The examples of manner 1 further include a case where cells A and B both transmit ePDCCHs normally. Generally, the example may be implemented when cells A and B have the same transmission power and both have low transmission power.

FIG. 3B shows an example of an interference coordination manner of manner 2. In the example, interference of ePDCCHs occurs between neighboring cells A and B, and alternatively, the interference may also occur between the ePDCCH of cell A and the PDSCH of cell B. As shown in FIG. 3B, cell A transmits ePDCCH normally and cell B blanks a resource for transmitting ePDCCH (or PDSCH). The example is substantially applicable in various wireless communication scenes. For example, it is applicable in the case where the transmission powers of neighboring cells A and B are different. For example, the cell A with a low transmission power is caused to transmit ePDCCH normally and the cell B with a higher transmission power is caused to blank the resource for transmitting ePDCCH.

FIG. 3C shows an example of an interference coordination manner of manner 3. In the example, interference occurs between ePDCCHs of cells A and B, or between ePDCCH of cell A and PDSCH of cell B. As shown in FIG. 3C, cell A transmits ePDCCH normally, and cell B allocates the resource for transmitting ePDCCH (or PDSCH) to user equipments in its center region or other sectors to transmit one of PDSCH and ePDCCH. In the example shown in FIG. 3C, cell B allocates the resource for transmitting ePDCCH (or PDSCH) to user equipments in its center region to transmit PDSCH. The interference coordination manner of manner 3 is applicable in various wireless communication scenes. For example, it is applicable in the case where the neighboring cells A and B have the same transmission power and are the both have high transmission power.

Hereinafter, step S103 of the wireless communication method shown in FIG. 1, that is, how to determine different interference coordination manners according to different scenes, will be described as example in conjunction with specific embodiments and FIG. 4.

Figure 4:
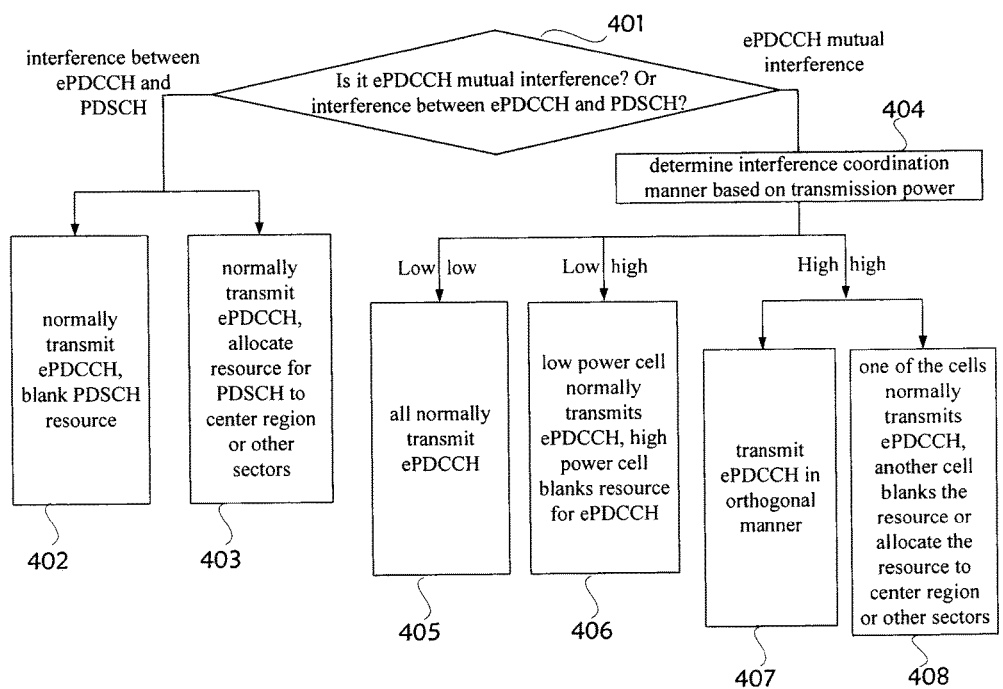
FIG. 4 is a schematic diagram showing an example of determining different interference coordination manners according to different scenes.

FIG. 4 is a schematic diagram of an example of determining different interference coordination manners according to different scenes. Since the transmission priority of ePDCCH is generally higher than that of PDSCH, as shown in FIG. 4, it may be firstly determined whether the interference occurs between the transmissions of ePDCCHs or between the transmissions of ePDCCH and PDSCH (401). If it is determined that the interference occurs between ePDCCH and PDSCH, an interference coordination manner may be selected according to a previous setting, such that ePDCCH is transmitted normally and a resource corresponding to PDSCH is blanked (402, which is an example of the coordination manner 2 described above). Alternatively, an interference coordination manner can be selected such that ePDCCH is normally transmitted and the resource corresponding to PDSCH is allocated to user equipments in the center region or other sectors of a cell using the resource, to transmit PDSCH or ePDCCH (403, which is an example of the coordination manner 3 described above).

If it is determined that the interference occurs between ePDCCHs of the neighboring cells, according to an embodiment, the interference coordination manner may be determined based on transmission powers of the neighboring cells. For example, if the transmission powers of the neighboring cells are the same and both low, since the interference between the cells is weak, the interference coordination manner may be determined such that ePDCCH of each of the neighboring cells is transmitted normally (405, which is an example of the coordination manner 1 described above).

In another example, if the transmission power of the neighboring cells are the same and both high, since the interference between the neighboring cells is strong, the transmissions of ePDCCHs needs to be separated in a time division or a spatial division manner. In an embodiment, an interference coordination manner may be determined such that the neighboring cells transmit ePDCCHs in an orthogonal manner (407, which is an example of the coordination manner 1 described above). Specifically, the transmissions of ePDCCHs of the neighboring cells may multiplex frequency in a bitmap manner.

Alternatively, an interference coordination manner can be determined such that one of the two cells with high transmission powers transmit ePDCCH normally and a resource corresponding to ePDCCH of the other cell is blanked (408, which is an example of the coordination manner 2 described above). In the embodiment, for example, the cell which transmits ePDCCH normally may be determined based on fairness factors of user equipments under the interference to ePDCCH. More specifically, the cell at which the user equipments having higher fairness factors are located may be determined as the cell which transmits ePDCCH normally. It is well-known to those skilled in the art how to gain the fairness factor of a user equipment and the detail thereof is omitted herein.

Alternatively, in another embodiment, an interference coordination manner may be determined such that one of the two cells with high transmission powers transmits ePDCCH normally and the other cell allocates the resource for transmitting ePDCCH to user equipments in its center region or other sectors to transmit PDSCH or ePDCCH (408, which is an example of the coordination manner 3 described above). In the embodiment, for example, the cell which transmits ePDCCH normally may be determined based on the fairness factors of user equipments under the interference to ePDCCH. More specifically, the cell at which user equipments having higher fairness factors are located may be determined as the cell which transmits ePDCCH normally.

In another embodiment, in a case that the transmission powers of neighboring cells are different, the transmission priority of the cell with a low transmission power is set to be higher than that of the cell with a high transmission power since the cell with low transmission power is generally under a hot spot coverage or a blind spot coverage. Therefore, an interference coordination manner is determined such that ePDCCH of the cell with the low transmission power is transmitted normally, and the resource corresponding to ePDCCH of the cell with the high transmission power is blanked (406, which is an example of the coordination manner 2 described above).

Returning to FIG. 1, step S104 is performed after different interference coordination manners are determined according to different scenes in response to the determination on the presence of interference of ePDCCH in step S103. In step S104, the transmission of ePDCCHs or PDSCHs of the neighboring cells are controlled based on the determined interference coordination manner.

It should be noted that, in a case where baseband is shared between neighboring cells, an interference coordination manner is determined by a baseband processing center based on ePDCCH configuration conditions of the cells as well as other information such as cell transmission power and user equipment fairness factor, etc., held by the baseband processing center. It is unnecessarily to inform a base station of any cell of the determined interference coordination manner by transmitting new signaling.

On the contrary, in a case of unshared baseband, a base station determining the interference coordination manner needs to inform a neighboring cell, with which the base station interferes, of a final determined result. For example, a 2-bit signaling may be defined to inform of the determined interference coordination manner in a case that there are three coordination manners. For example, in a case that the topology structure of a network is irregular, such as a coexistance of a macrocell and a microcell, interference coordination signaling for informing the coordination manner may be transmitted through X2 or S1 interface between the macrocell and the microcell.

Figure 5:
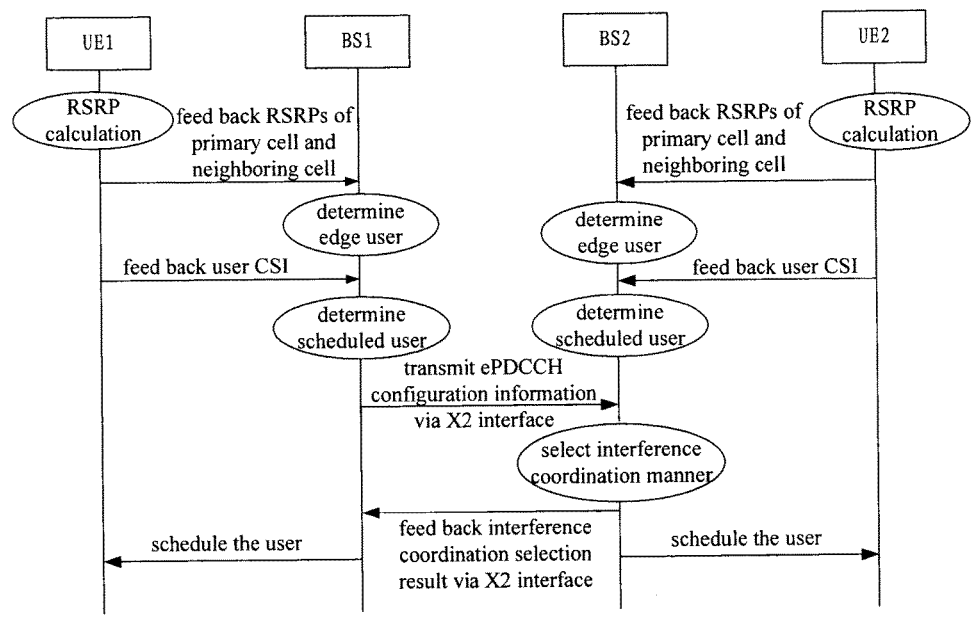
FIG. 5 is a sequence diagram showing signaling interactions between base stations of neighboring cells and user equipment being respectively served by the base stations.

In the case of unshared baseband, FIG. 5 is a sequence diagram exemplifying signaling interactions between base stations of neighboring cells, BS1 and BS2, and user equipments (including such as UE1 and UE2) being respectively served by BS1 and BS2. As shown in FIG. 5, the user equipments including such as user equipments UE1 and UE2 respectively calculate Reference Signal Received Powers (RSRPs) of their primary cells (serving cells) and RSRPs of an neighboring cells and feedback the calculation results respectively to the serving base stations, BS1 and BS2. Base stations BS1 and BS2 respectively determine whether a user equipment is an edge user based on the obtained RSRP.

In addition, the user equipments including UE1 and UE2 also feedback Channel State Information (CSI) to the respective serving base stations, BS1 and BS2. Hence, base stations BS1 and BS2 can determine a user to be scheduled based on information such as CSI provided by the user equipments. It is well-known to those skilled in the art how to determine the user equipment to be scheduled, and the detail description thereof is omitted herein.

After determining the user equipments to be scheduled, base stations BS1 and BS2 determine whether an edge user exists among the user equipments to be scheduled. If the edge user exists, base stations BS1 and BS2 transmit ePDCCH configuration information of the edge user equipment among the determined user equipments to be scheduled through X2 interface therebetween. In the embodiment shown in FIG. 5, base station BS1 transmits the ePDCCH configuration information to base station BS2. Then base station BS2 determines a suitable interference coordination manner based on the received ePDCCH configuration information and the ePDCCH configuration information held by itself. After determining the suitable interference coordination manner, base station BS2 feeds the determination result back to base station BS1. Finally, base stations BS1 and BS2 schedule the user equipments in the determined interference coordination manner and control the transmissions of ePDCCH and PDSCH.

Figure 6:
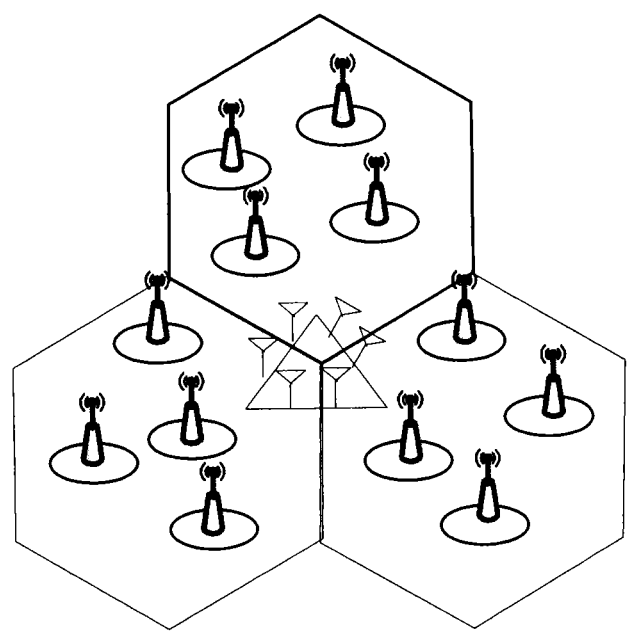
FIG. 6 is a schematic diagram showing a wireless communication network which is divided into several interference coordination clusters, according to an embodiment of the present invention.

In the following, another embodiment of the wireless communication method according to the present disclosure is described in conjunction with FIGS. 6 and 7. In the embodiment, a wireless communication network can be divided into several interference coordination clusters. FIG. 6 is a schematic diagram showing a wireless communication network which can be divided into several interference coordination clusters according to the embodiment. In the embodiment shown in FIG. 6, each interference coordination cluster includes one macrocell as well as 4 microcells covered by Remote Radio Heads (RRH). An example of the wireless communication network which can be divided into several interference coordination clusters is, for example, a wireless communication network in which the base station of each cluster is connected to a baseband processing center (center node) with optical fiber.

In a case that the wireless communication network is divided into several interference coordination clusters in which transmission points share a baseband, when mutual interference occurs between the ePDCCHs of edge users of neighboring cells, an interference coordination between the neighboring cells may be performed based on achievable intra-cluster system throughput $T_t$ and cluster fairness factor $P_t$ estimated for different interference coordination manners. Here, the achievable intra-cluster system throughput (system estimated throughout) $T_t$ is defined as the sum of throughputs of user equipments in an interference coordination cluster, as shown in formula (2). The cluster fairness factor (system fairness factor) $P_t$ is defined as the average of fairness factors of user equipments in an interference coordination cluster, as shown in formula (3).

$$T_t = \sum_{i=1}^{n} Throughput_i \quad (2)$$

$$P_t = \frac{1}{n}\sum_{i=1}^{n} p_i \quad (3)$$

Wherein $p_i$ and Throughput$_i$ are respectively the fairness factor and throughput of user i in the interference coordination cluster to be scheduled, and n is the number of users to be scheduled.

Figure 7:
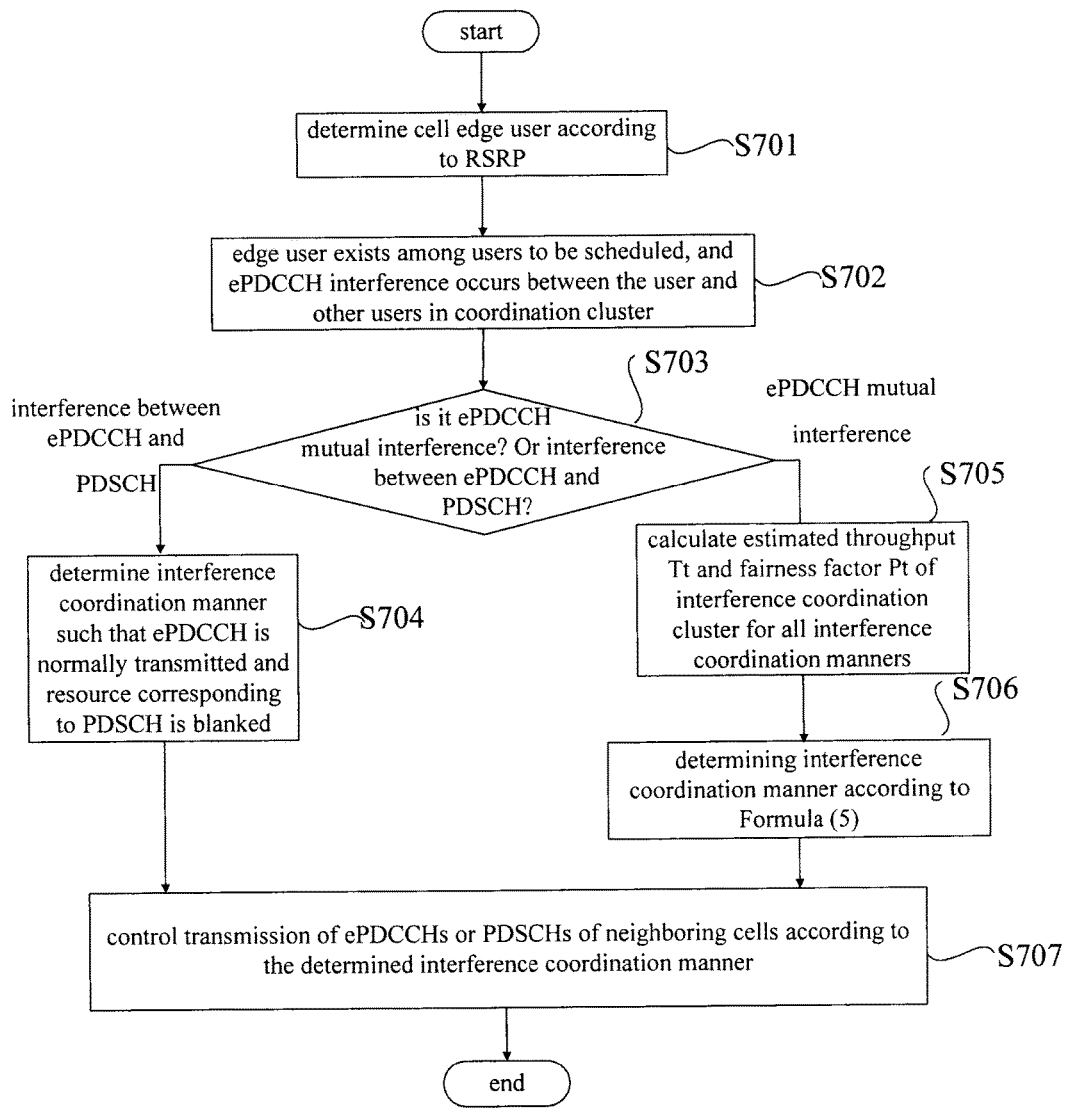
FIG. 7 is a flowchart showing a wireless communication method applied in a wireless communication network which may be divided into several interference coordination clusters, according to an embodiment of the present invention.

The embodiment is described in detail by taking FIG. 7 as an example. FIG. 7 is a flowchart of a wireless communication method applied in the wireless communication network divided into several interference coordination clusters as shown in FIG. 6.

In step S701, whether a corresponding user equipment is an edge user is determined by comparing RSRP value of the serving cell with RSRP values of other cells in the cluster. The edge user may be defined and determined by employing the method described in conjunction with Formula (1).

In step S702, n users to be scheduled are determined according to a scheduling algorithm. For example, taking the proportional fair algorithm as an example, fairness factor $p_i$ of a user equipment in the interference coordination cluster is calculated as shown in Formula (4).

$$p_i = r_i/R_i \quad (4)$$

Wherein $r_i$ represents a throughput of user i on a current time-frequency resource, and $R_i$ represents the average throughput of user i on a certain time duration.

N user equipments to be scheduled are determined based on fairness factors of users. In step S702, if it is determined that an edge user exists among the n user equipments and ePDCCH interference occurs between the edge user and other edge users in the interference coordination cluster, then step S703 is performed. Otherwise, the scheduling is performed directly based on a scheduling result.

In step S703, it is determined whether the ePDCCH interference occurred is a mutual interference between ePDCCHs or an interference between ePDCCH and PDSCH.

In the example, the processing proceeds to step S704 if it is determined that the interference is between ePDCCH and PDSCH. In step S704, an interference coordination manner is determined such that ePDCCH is transmitted normally and the resource corresponding to PDSCH is blanked. Of course, alternatively, the resource corresponding to PDSCH may also be used by users in the center or other sectors of the cell.

In the example, the processing proceeds to step S705 if it is determined that the interference occurs between ePDCCHs. In step S705, an estimated throughput $T_t$ and a fairness factor of the interference coordination cluster, $P_t$, are calculated for all interference coordination manners preset. The methods for calculating the estimated throughput $T_t$ and the fairness factor of interference coordination cluster, $P_t$, are those described above in conjunction with Formulas (2) and (3), for example.

After the estimated throughput $T_t$ and the fairness factor of interference coordination cluster, $P_t$, are calculated for all interference coordination manners, in step S706, an interference coordination manner is determined according to Formula (5).

$$v = \begin{cases} \arg\max\ P_t, & \text{if } (\max P_t - \min P_t) > Th \\ \arg\max\ T_t, & \text{otherwise} \end{cases}, t \in [1, 2, 3] \quad (5)$$

Wherein v represents the interference coordination manner finally determined, t represents a predetermined interference coordination manner where in this example there are 3 predetermined interference coordination manners, and Th may be a threshold value selected based on a simulation result.

As shown in Formula (5), if at least one of differences between any two of cluster fairness factors estimated for different interference coordination manners is higher than the threshold Th, that is to say, if the difference between the maximal and minimal estimated values of the cluster fairness factor is higher than the threshold Th, then it is determined to employ an interference coordination manner for which the estimated value of the cluster fairness factor is the highest. If the maximum of differences between any two of the cluster fairness factors estimated for different interference coordination manners, i.e., the difference between the maximal and minimal estimated values of the cluster fairness factor, is lower than or equal to the threshold Th, then it is determined to employ an interference coordination manner which brings about the highest estimated value of an achievable system throughput in cluster.

The threshold Th may be set based on an optimal simulation result. If the difference between the maximal and minimal estimated values of the cluster fairness factor is higher than the threshold Th, it means that: as compared with a coordination manner corresponding to the minimum cluster fairness factor, there are users having not been scheduled for a long time in a coordination manner corresponding to the maximum cluster fairness factor, and the resources occupied by these users are often left blank. The interference coordination manner is determined as the target interference coordination manner to ensure the fairness of the scheduling. Otherwise, the base station may choose the interference coordination manner with the maximal throughput.

Hereinafter, a wireless communication device for executing the wireless communication method according to the present disclosure is described in conjunction with FIGS. 8 and 9.

Figure 8:
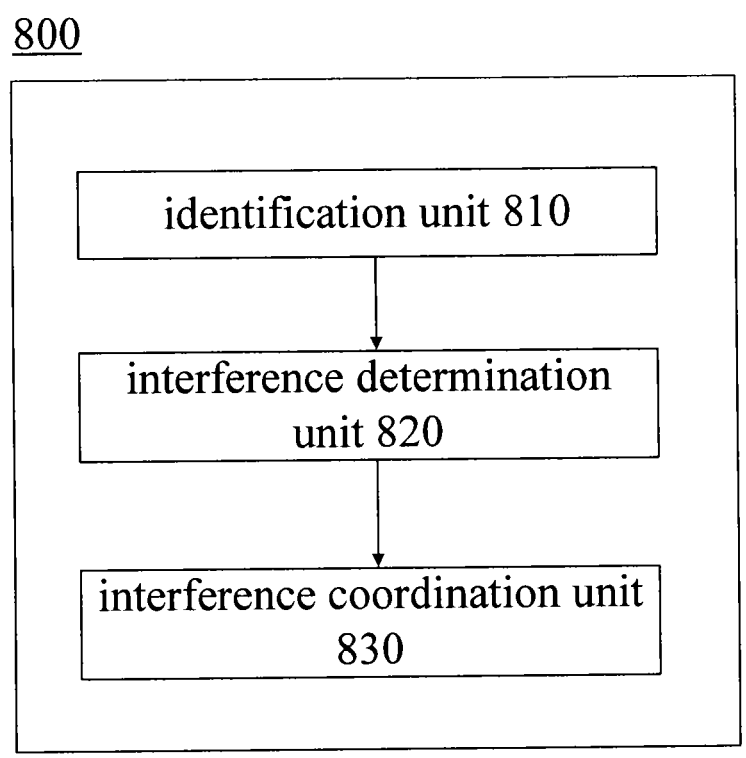
FIG. 8 is a block diagram showing a functional structure of a wireless communication device according to an embodiment of the present invention.
Figure 9:
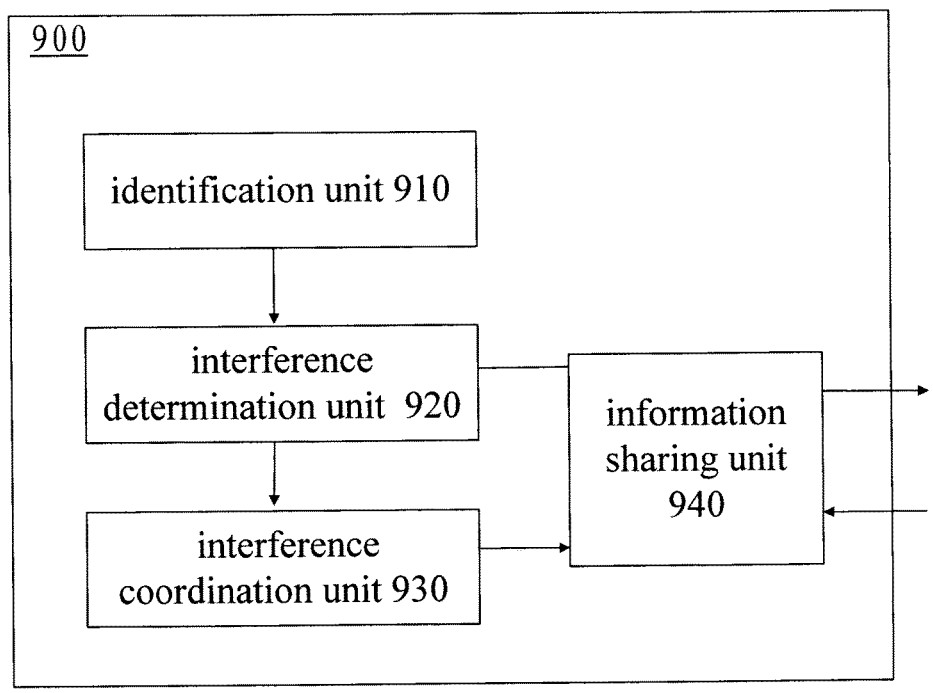
FIG. 9 is a block diagram showing a functional structure of a wireless communication device according to another embodiment of the present invention.

FIG. 8 is a block diagram showing a functional structure of a wireless communication device 800 according to an embodiment of the present invention. The wireless communication device 800 includes: an identification unit 810, an interference determination unit 820 and an interference coordination unit 830.

The identification unit 810 is configured to identify an edge user equipment. The identification unit 810 performs a processing corresponding to step S101 in FIG. 1. For example, the identification unit 810 may identify the edge user equipment by comparing RSRP of the serving cell and RSRPs of neighboring cells.

The interference determination unit 820 is configured to determine the presence of interference on ePDCCH of the edge user equipment. The interference determination unit 820 performs a processing corresponding to step S102 in FIG. 1 to determine whether the interference on ePDCCH exists.

The interference coordination unit 830 is configured to determine different interference coordination manners according to different scenes, so as to control the transmission of ePDCCHs or PDSCHs of neighboring cells related to the interference. That is to say, the interference coordination unit 830 performs processing corresponding to steps S103 and S104 in FIG. 1.

In an example, in a case that interference occurs between ePDCCH and PDSCH of neighboring cells, the interference coordination unit 830 may blank a resource corresponding to PDSCH.

Alternatively, in the case that the interference occurs between ePDCCH and PDSCH of the neighboring cells, the interference coordination unit 830 may also allocate the resource corresponding to PDSCH to user equipments in the center region or other sectors of the cell using the resource, for transmitting PDSCH or ePDCCH.

In an example, in a case that the interference occurs between ePDCCHs of neighboring cells, the interference coordination unit 830 may determine an interference coordination manner based on transmission powers of the neighboring cells. For example, the interference coordination unit 830 may make the neighboring cells transmit ePDCCHs normally if the transmission powers of the neighboring cells are the same and both low. And the interference coordination unit 830 may make the neighboring cells transmit ePDCCHs in an orthogonal way if the transmission powers of the neighboring cells are the same and both high. For example, the interference coordination unit 830 may make the transmissions of ePDCCHs of the neighboring cells perform frequency multiplexing in a bitmap manner.

In another example, the interference coordination manner 830 may make one of the two cells with high transmission powers transmit ePDCCH normally and make the other cell blank the resource corresponding to the ePDCCH if the transmission powers of the neighboring cells are the same and both high. For example, the interference coordination unit 830 may determine the cell which transmits ePDCCH normally based on a fairness factor of user equipments under the interference of ePDCCH. More specifically, a cell at which the user equipment having higher fairness factor is located may be determined as the cell transmitting ePDCCH normally.

In another example, if the transmission powers of the neighboring cells are the same and both high, the interference coordination unit 830 may make one of the neighboring cells transmit ePDCCH normally and make the other cell allocate the resource for transmitting ePDCCH to user equipments in the center region or other sectors of the cell, for transmitting PDSCH or ePDCCH. For example, the interference coordination unit 830 may determine a cell transmitting ePDCCH normally based on a fairness factor of user equipments under the interference of ePDCCH. More specifically, the cell at which the user equipment having a higher fairness factor locates is determined as the cell transmitting ePDCCH normally.

In a further example, if the transmission powers of the neighboring cells are different, the interference coordination unit 830 may make the cell with the lower transmission power of the neighboring cells transmit ePDCCH normally and make the cell with the higher transmission power blank the resource for transmitting ePDCCH.

In yet another example, in a case that the wireless communication network is divided into several interference coordination clusters in which transmission points share a baseband, when mutual interference occurs between ePDCCHs of edge users of the neighboring cells, the interference coordination unit 830 may determine an interference coordination manner between the neighboring cells based on an achievable intra-cluster system throughput and a cluster fairness factor which are estimated for different interference coordination manners. Wherein the achievable intra-cluster system throughput is defined as a sum of throughputs of users in an interference coordination cluster, and the cluster fairness factor is defined as an average of fairness factors of users in an interference coordination cluster.

In an example, the interference coordination unit 830 determines to employ an interference coordination manner for which the estimated value of the cluster fairness factor is the highest if a difference between the maximal and minimal values of the cluster fairness factors estimated for different interference coordination manners is higher than a threshold. And the interference coordination unit 830 determines to employ an interference coordination manner for which the estimated value of the achievable intra-cluster system throughput is the highest if the difference between the maximal and minimal values of the cluster fairness factor estimated for different interference coordination manners is lower than or equal to the threshold. The threshold may be set such that: if the difference between the maximal and minimal values of the cluster fairness factor is higher than the threshold, it means that, as compared with the coordination manner for which the cluster fairness factor is the lowest, there are users having not been scheduled for a long time in the coordination manner for which the cluster fairness factor is the highest.

Specific embodiments for the above examples have been introduced in conjunction with the wireless communication method according to the present disclosure, and will not be described in detail herein. In the following, another embodiment of the wireless communication device according to the present disclosure is described in conjunction with FIG. 9, which is a block diagram showing a functional structure of a wireless communication device according to another embodiment of the present invention.

The wireless communication device 900 includes an identification unit 910, an interference determination unit 920, an interference coordination unit 930 and an information sharing unit 940. The functions and structures of the identification unit 910, the interference determination unit 920 and the interference coordination unit 930 are the same as those of the identification unit 810, the interference determination unit 820 and the interference coordination unit 830 as described in conjunction with FIG. 8. Therefore, the detailed descriptions thereof are omitted herein.

The information sharing unit 940 may transmit configuration sharing signaling between neighboring cells to share the configuration of ePDCCHs in a case that the neighboring cells on which interference coordination is performed do not share a baseband. Moreover, the information sharing unit 940 may transmit interference coordination signaling between the neighboring cells via X2 or S1 interface to inform of a determined interference coordination manner. A 2-bit signaling may be used as the interference coordination signaling in a case that, for example, 3 predetermined interference coordination manners are included.

In an example, the wireless communication device according to the disclosure may employ, for example, at least one of the following interference coordination manners according to different scenes. The above examples are respectively specific examples of the following three manners. The interference coordination manner includes:

Manner 1, neighboring cells related to an interference all transmit ePDCCHs;

Manner 2, one of the neighboring cells related to the interference transmits ePDCCH normally and the other cell blanks a resource for transmitting ePDCCH or PDSCH;

Manner 3, one of the neighboring cells related to the interference transmits ePDCCH normally, and the other cell allocates the resource for transmitting ePDCCH or PDSCH to user equipments in the center region or other sectors of the cell for transmitting one of PDSCH and ePDCCH.

In an embodiment, the wireless communication device according to the present disclosure may be a base station.

With the wireless communication method and wireless communication device described above, higher cell average spectrum efficiency is ensured, while the interference between ePDCCHs of edge users is reduced, the accuracy of control signals received by the edge users is ensured, and a spectrum efficiency of the edge user of the cell is significantly improved.

In the above descriptions of specific embodiments of the present invention, features described/shown for an embodiment may be used in one or more other embodiments in the same or a similar way, be combined with features of other embodiments or replacing the features of other embodiments.

It should be noted that, the terminologies of "comprise" indicates the existing of a feature, an element, a step or a component when used herein, but does not exclude the existence or addition of one or more other features, elements, steps or components.

Furthermore, the methods according to the embodiments of the present invention are not limited to be executed in the time orders described in the specification or shown in the drawings, but can be executed in other time orders, in parallel or independently. Therefore, the executing orders described in the specification are not intended to limit the technical scope of the invention.

The invention claimed is:

1. A wireless communication device for use in a Coordinated Multi-Point communication system, comprising:
   a processor configured to
      identify an edge user equipment;
      determine a presence of interference on Enhanced Physical Downlink Control Channel (ePDCCH) of the edge user equipment; and
      in response to the determination of a presence of the interference, determine different interference coordinating manners based on different relationships of channels with mutual interference, to control a transmission of ePDCCHs or Physical Downlink Sharing Channels (PDSCH) of neighboring cells related to the interference.

2. The wireless communication device according to claim 1, wherein when interference on ePDCCH and PDSCH occurs in the neighboring cells, the processor blanks a transmission for a corresponding resource of the PDSCH.

3. The wireless communication device according to claim 1, wherein when interference on ePDCCH and PDSCH occurs in the neighboring cells, the processor allocates a corresponding resource for PDSCH to user equipments in a center region or another sector in the cell using the resource to transmit PDSCH or ePDCCH.

4. The wireless communication device according to claim 1, wherein when ePDCCH mutual interference occurs in the neighboring cells, the processor determines the interference coordinating manner according to transmission powers of the neighboring cells.

5. The wireless communication device according to claim 4, wherein the neighboring cells have the same transmission power and are all low power transmission cells, the processor makes the neighboring cells all transmit ePDCCH normally.

6. The wireless communication device according to claim 4, wherein when the neighboring cells have the same transmission power and are all high power transmission cells, the processor makes the neighboring cells transmit ePDCCH in an orthogonal manner.

7. The wireless communication device according to claim 6, wherein frequency multiplexing is performed in a bitmap manner in ePDCCH transmission of the neighboring cells.

8. The wireless communication device according to claim 4, wherein when the neighboring cells have the same transmission power and are all high power transmission cells, the processor makes one of the neighboring cells transmit ePDCCH normally, and makes another cell allocate a resource for ePDCCH transmission to user equipments in its center region or other sectors to transmit PDSCH or ePDCCH;

wherein the processor determines a cell transmitting ePDCCH normally according to a fairness factor of user equipments on which ePDCCH interference occurs, wherein a cell where a user equipment having a higher fairness factor locates is determined as a cell transmitting ePDCCH normally.

9. The wireless communication device according to claim 4, wherein when the neighboring cells have different transmission powers, the processor makes a cell having a lower transmission power in the neighboring cells transmit ePDCCH normally, and makes a cell having a higher transmission power blank a resource for transmitting ePDCCH.

10. The wireless communication device according to claim 1, further comprising a transmitter configured to, in case that neighboring cells in which interference coordination is performed do not share a baseband, share configuration of ePDCCH by transmitting a configuration sharing signaling among neighboring cells.

11. The wireless communication device according to claim 10, wherein the transmitter notifies a determination result of an interference coordinating manner by transmitting an interference coordination signaling among neighboring cells.

12. The wireless communication device according to claim 1, wherein when a wireless communication network is divided into a number of interference coordination clusters in which transmission points share a baseband, when ePDCCH mutual interference occurs on edge users in the neighboring cells in the cluster, the processor determines an interference coordinating manner among neighboring cells according to a cluster fairness factor and an achievable system throughput inside the cluster estimated for different interference coordinating manners; the achievable system throughput inside the cluster is defined as a sum of throughputs of user equipments in interference coordination cluster, and the cluster fairness factor is defined as an average value of fairness factors of user equipments in interference coordination cluster.

13. The wireless communication device according to claim 1, wherein when ePDCCH mutual interference occurs on the neighboring cells, the interference coordinating manners comprise at least one of the following:

manner 1: the neighboring cells all transmit ePDCCH;
manner 2: one of the neighboring cells transmits ePDCCH normally, and another cell blanks a resource for transmitting ePDCCH or PDSCH;
manner 3: one of the neighboring cells transmits ePDCCH normally, and another cell allocates a resource for transmitting ePDCCH or PDSCH to user equipments in its center region or other sectors to transmit one of PDSCH and ePDCCH.

14. A wireless communication method for use in a Coordinated Multi-Point communication system, comprising:
identifying an edge user equipment;
determining a presence of interference on enhanced Physical Downlink Control Channel (ePDCCH) of the edge user equipment;
determining different interference coordinating manners based on different relationships of channels with mutual interference in response to a determination of a presence of the interference; and a
controlling transmission of ePDCCHs or Physical Downlink Sharing Channels (PDSCH) of neighboring cells related to the interference.

15. The wireless communication method according to claim 14, wherein when interference on ePDCCH and PDSCH occurs in the neighboring cells, a transmission of a corresponding resource for the PDSCH is blanked.

16. The wireless communication method according to claim 14, wherein when interference on ePDCCH and PDSCH occurs in the neighboring cells, a corresponding resource for the PDSCH is allocated to user equipments in a center region or in another sector in the cell using the resource to transmit PDSCH or ePDCCH.

17. The wireless communication method according to claim 14, wherein when ePDCCH mutual interference occurs in the neighboring cells, the interference coordinating manner is determined according to transmission powers of the neighboring cells.

18. A non-transitory computer storage medium, comprising computer readable instructions for causing a computer to perform a wireless communication method for use in a Coordinated Multi-Point communication system, comprising:
identifying an edge user equipment;
determining a presence of interference on enhanced Physical Downlink Control Channel (ePDCCH) of the edge user equipment;
determining different interference coordinating manners based on different relationships of channels with mutual interference in response to a determination of a presence of the interference; and
controlling a transmission of ePDCCHs or Physical Downlink Sharing Channels (PDSCH) of neighboring cells related to the interference.

19. An apparatus in a wireless communication system, comprising a storage and at least one processor, wherein the storage is configured to store computer instructions and the at least one processor is configured to execute the computer instructions stored in the storage, to perform
a wireless communication method for use in a Coordinated Multi-Point communication system, comprising:
identifying an edge user equipment;
determining a presence of interference on enhanced Physical Downlink Control Channel (ePDCCH) of the edge user equipment;
determining different interference coordinating manners based on different relationships of channels with mutual interference in response to a determination of a presence of the interference; and
controlling a transmission of ePDCCHs or Physical Downlink Sharing Channels (PDSCH) of neighboring cells related to the interference.

* * * * *